United States Patent
Evrard et al.

[11] Patent Number: 6,155,254
[45] Date of Patent: Dec. 5, 2000

[54] SELF-CONTAINED DEVICE FOR CHEMICALLY PRODUCING HIGH-PRESSURE BREATHING OXYGEN

[75] Inventors: Patrick Evrard, Orleans; Francois Lavoix, Verac, both of France

[73] Assignees: ETAT Francais; Societe Nationale des Poudres et Explosifs, both of Paris, France

[21] Appl. No.: 09/051,756

[22] PCT Filed: Oct. 16, 1996

[86] PCT No.: PCT/FR96/01611

§ 371 Date: Sep. 11, 1998

§ 102(e) Date: Sep. 11, 1998

[87] PCT Pub. No.: WO97/15525

PCT Pub. Date: May 1, 1997

[30] Foreign Application Priority Data

Oct. 20, 1995 [FR] France ................................... 95 12360

[51] Int. Cl.[7] .................................................. A61M 15/00
[52] U.S. Cl. ........................................................ 128/202.26
[58] Field of Search ....................... 425/352; 128/203.26, 128/202.26, 203.15

[56] References Cited

U.S. PATENT DOCUMENTS 3,615,252  10/1971  DiPietro .
3,773,044  11/1973  Wallace .
3,914,355  10/1975  Thompson .
4,155,307   5/1979  Kluchert et al. .
4,246,229   1/1981  McBride et al. .
4,559,066  12/1985  Hunter et al. .
5,058,578  10/1991  Weiss .
5,380,467   1/1995  Lin et al. .
5,656,793   8/1997  Ochi et al. .

Primary Examiner—Michael A. Brown
Assistant Examiner—Lalita Hamilton
Attorney, Agent, or Firm—Pillsbury Madison & Sutro LLP

[57] ABSTRACT

The invention relates to a self-contained device for generating high-pressure breathing oxygen, of the type comprising an oxygen-generating chemical candle (3), a gastight confinement chamber composed of a body (1) and of a cover (2), in which chamber the candle is housed, means of igniting the candle, means of percussing the igniter and means of filtering the oxygen generated, characterized in that the igniting means consist of a compressed mixture of titanium and boron and in that the filtering means consist of a mixture of lime or soda lime and of molecular sieve and are distributed, on the one hand, packed in around the candle and, on the other hand, in a cartridge having a generated-oxygen outlet cap.

Application to the generation of oxygen in the medical or paramedical field, the aeronautics field and the military field.

14 Claims, 3 Drawing Sheets

SELF-CONTAINED DEVICE FOR CHEMICALLY PRODUCING HIGH-PRESSURE BREATHING OXYGEN

This application is the national phase of international application PCT/FR96/01611 filed Oct. 16, 1996 which designated the U.S.

The present invention relates to a self-contained device for chemically generating high-pressure breathing oxygen.

The technical sector of the invention is that of the instantaneous supply of breathing oxygen.

The intended fields are the medical or paramedical field, the aeronautics field and the military field.

The main known processes used for generating oxygen corresponding to industrial or medical standards are distillation after air liquefaction, electrolysis of water, and chemical processes.

Although the first two processes are widely used in industry, in particular for distillation, the equipment employed is heavy, bulky and complex. Furthermore, in the case of distillation, it does not allow the desired gas to be obtained instantaneously, given that an air-cooling phase is necessary for the liquefaction.

Chemical processes, by contrasts, get around the problem of complex apparatuses and are particularly suitable for extreme situations such as remote or isolated sites, natural disasters, and emergency, crisis or conflict situations.

One of the various known processes for chemically generating oxygen which may be cited is the process consisting in using solid agglomerates which release oxygen by thermochemical decomposition.

The basic material used in these agglomerates, known as chemical candles, is an oxygen-containing salt capable of liberating oxygen by heating.

Generally, alkali-metal chlorates are used, these being mixed with a catalyst of the metal-oxide type which lowers the decomposition temperature and with a combustible substance whose oxidation releases the heat necessary to maintain the temperature of the oxido-reduction reaction.

Nevertheless, the devices for chemically generating oxygen have two major drawbacks:

they do not allow oxygen to be generated at high pressure, e.g. for filling bottles or tanks, since there is a risk of the thermochemical reaction of the solid agglomerates used degenerating, which may thus result in an explosion;

upon initiating the reaction, a considerable amount of carbon monoxide and dioxide is generated, which prevents the generated gas being used in the medical field where conformity to the pharmacopoeia is mandatory.

These drawbacks have been remedied by using a carbon-free fuel of high reactivity, and avoiding the risk of explosion, namely magnesium.

French Patent No. 1,403,612 describes an apparatus for generating breathing oxygen which comprises an active substance based on an alkali-metal chlorate mixed with a catalyst consisting of manganese dioxide and with magnesium as the fuel.

However, such an active substance does not have a high yield for its volume since the relative density of the agglomerate remains close to that of the alkali-metal chlorate, in this case sodium chlorate, i.e. about 1.6.

French Patent 2,620,435 discloses agglomerates containing the same ingredients but having a relative density greater than 1.8. These solid agglomerates are obtained by compression above $10^8$ Pa (1000 bar) of a mixture based on sodium chlorate ($NaClO_3$), sodium dichromate ($NaCr_2O_3$), manganese dioxide ($MnO_2$), magnesium (Mg) and water ($H_2O$). The presence of water is necessary as it acts as a cohesion agent and ensures that the mixture is very safe to use by making it inert. Despite the high pressures applied when manufacturing the agglomerates, the risks of these mixtures suddenly decomposing and exploding are thus avoided.

The candle confined in a pressurized container must be ignited by means suitable for this purpose.

French Patent 2,523,867 describes a chemical oxygen generator in which the pressurized container in which the candle is housed, held between two perforated discs, forms an empty space all around the candle in which the oxygen, on passing through a membrane which is perforated when the igniting means are triggered, can escape via an outlet orifice. However, the configuration of this apparatus does not allow the pressure to rise to a high value and, in addition, the system can be used only once since it is not possible to replace the candle.

One object of the present invention is to generate oxygen at high pressure, i.e. greater than or equal to 100 bar, for filling bottles or tanks, directly in the field by means of a lightweight and compact device which is simple to use.

Another object of the invention is to provide so-called medical oxygen, i.e. oxygen whose characteristics and purity comply with the European Pharmacopoeia, i.e. an oxygen content of 99.5%, a maximum carbon monoxide content of 5 ppm and a maximum carbon dioxide content of 300 ppm.

To achieve this, the subject of the invention is a self-contained device for generating high-pressure breathing oxygen, of the type comprising an oxygen-generating candle, a gastight confinement chamber composed of a body and of a cover, in which chamber the candle is housed, means of igniting the candle, means of percussing the igniter and means of filtering the oxygen generated, characterized in that the igniting means consist of a compressed mixture of titanium and boron and in that the filtering means consist of a mixture of lime or soda lime and of molecular sieve and are distributed, on the one hand, packed in around the candle and, on the other hand, in a cartridge having a generated-oxygen outlet cap.

Preferably, the percussion means comprise a first part integral with the gastight confinement chamber and a second part which is independent of the first part and actuated by an external actuator.

According to one embodiment, the first part of the percussion means consist of a movable needle and a seal, the internal face of the needle taking the pressure of the oxygen generated, and the second part consists of a hammer translationally guided and propelled by springs, the hammer being actuated by a manual arming lever.

The chemical candle is a solid agglomerate composed of sodium chlorate, sodium dichromate, manganese dioxide, magnesium and demineralized water.

The solid agglomerate has a relative density of at least 2.4.

According to a preferred embodiment, the filtering means furthermore comprise a mixture of various oxides, known by the trade name "hopcalite", and of hygroscopic salts.

Preferably, the hopcalite is in direct contact with the candle and is placed as a mixture with lime in granules around the candle and on the rear face inside the filter cartridge.

Advantageously, the molecular sieve is placed at the end of the candle, as far away from the high-temperature regions as possible.

Preferably, the body and the cover of the chamber are made of a single material which has undergone a self-lubricating and wear-resistance surface treatment.

This single material may be titanium or a special steel.

According to an alternative embodiment, the filtering means include an additional filter lying outside the chamber and comprising lime or soda lime, a molecular sieve, hopcalite and activated carbon.

In a preferred embodiment, the filtering means in the cartridge comprise a fine-particle filter.

This filter consists, for example, of mineral wool.

According to a variant, the oxygen generator includes a discharge valve allowing the air contained in the chamber to be removed when the candle ignites.

The oxygen generator of the invention makes it possible to generate oxygen for medical use.

The device according to the invention is applicable to the high-pressure filling of oxygen bottles or of tanks.

The candle is a solid agglomerate obtained by compressing a mixture containing, per 100 parts by mass of sodium chlorate, 5 to 7 parts by mass of manganese dioxide, 2 to 3 parts by mass of magnesium, approximately 0.3 parts by mass of sodium dichromate and demineralized water in an amount such that it represents together with the water optionally contained in the chlorate, approximately 1% of the mass of the dry chlorate.

The generation of oxygen results from the thermo-decomposition of the sodium chlorate mixed with the manganese dioxide, which acts as an oxidizing agent; this oxido-reduction reaction generates a large amount of heat, enabling the molecular bond between the oxygen atoms and the rest of the sodium molecule to be broken. The choice of reducing agent, in this case magnesium, is fundamental as it makes it possible to confine the candle under very high temperature and pressure conditions without the reaction degenerating.

Upon starting the operation of the candle, oxygen is liberated and the reaction, being inextinguishable and confined, the pressure rises.

A source of oxygen adjustable to the desired pressure is therefore available.

The candle consists of blocks which are very highly compressed until blocks having a relative density of 2.4 and higher are obtained. This characteristic is very important as it allows the rate of combustion to be controlled and ensures complete safety under the conditions of use. Furthermore, the ratio between the volume of the candle and the volume of oxygen generated is thereby increased, this being paramount in some applications, such as applications in submarines or aircraft.

The candle is placed in a casing made of a material suitable for the high temperature and pressure conditions and for the highly oxidizing environment. This casing may have any shape, parallelepipedal, cylindrical or other shape, and its dimensions may be varied depending on the requirements. This is because the volume of the casing of the candle is directly related to the volume of oxygen desired and to the application in question, for example high-pressure generation, atmosphere regeneration, oxygenotherapy or industrial requirement.

The weight of the chemical part will vary from a few tens of grams to more than ten kilograms, depending on the volume of oxygen.

Ignition of the candle is particularly delicate when it is desired to generate medical oxygen; this is because the initiation must be reliable and of high performance, without excessive generation of carbon monoxide.

The igniting part is composed of an igniter holder provided with its pyrotechnic igniter of the anvil type and with a compressed body of titanium and boron housed in a pellet for igniting the highly magnesium-enriched chlorate composition.

Whatever the type of application, the igniting part is the same with an igniter holder which can take any type of fitting, such as a striker-holder fitting, a male conical fitting or a female conical fitting. This standard ensures optimum effectiveness of the ignition by permanently controlling the spark chamber and the sealing of the assembly.

The objective of the filtering part is to purify the oxygen generated.

It comprises an adsorption filter and a particle filter.

The adsorption filter comprises lime, molecular sieve and, optionally, a mixture of various oxides known by the brand name of hopcalite.

Furthermore, the fine particles are filtered by a layer of mineral wool in the candle.

Among the filtering materials used, lime allows carbon dioxide to be absorbed; the molecular sieve fixes the residual water and traces of chlorine; the hopcalite removes carbon monoxide by catalyzing its conversion into carbon dioxide.

The arrangement of the filtering materials is very important.

The hopcalite requires high temperatures in order to operate; it is therefore placed as close as possible to the candle blocks, as a mixture with lime in granules around the blocks and on the rear face.

The molecular sieve must be as far away from the high-temperature regions as possible; it is placed entirely at the end of the candle.

A complementary filter, comprising the same components of lime or soda lime, hopcalite and molecular sieve, but also activated carbon, may be added in order to improve further the purity of the oxygen generated.

The cost of the combinations of filtering products which may be used will vary depending on the application envisaged. This is because, hopcalite is an expensive catalyst and the price of lime may vary by a factor of two depending on its source.

A distinction should be made between breathable oxygen and medical oxygen.

In order to obtain breathable oxygen, it is suitable to use a lime of average quality and a molecular sieve, which gives a carbon dioxide content of about 100 ppm, a carbon monoxide content of between 2 and 6 ppm and a few traces of water.

In order to obtain medical oxygen, use is made of a more reactive lime and of hopcalite arranged as a mixture and as a pad, which results in a minimum contamination of 2 ppm of carbon monoxide, less than 50 ppm of carbon dioxide and less than 60 ppm of water.

The purity of the oxygen generated also arises from the method of manufacturing the generator, where any source of accidental contamination is eliminated since the constituents other than the chemical and pyrotechnical constituents are mounted in a decontaminated environment.

Furthermore, in the case of medical-grade oxygen, the air contained in the generator when the candle is ignited is removed by any suitable means, such as a discharge valve, or by a manual purge lasting 30 seconds; during this time, the oxygen generated cleans the lines and reduces the carbon monoxide peak due to starting the candle.

The confinement chamber is in the form of a mechanical component made of a material capable of withstanding the stresses, these being of a mechanical origin, such as the pressure, thermal origin, due to the exothermicity of the reaction, and of chemical origin, due to the oxidizing environment.

The body and the lid of the generator are made of titanium or special steel.

In one embodiment, the mechanical connection between the body and the lid is provided by a bayonet device, the body and the lid each having five tenons around the circumference. A screw-closure system may also be used.

The geometry of the chamber has been optimized by three-dimensional volume and thermoelastic analysis using the finite-element method.

The outer wall of the body is corrugated so as to increase its mechanical resistance to pressure and to improve the cooling of the reaction chamber by natural convection, because of the increase in the area of contact with the ambient air.

The appended drawings, show preferred illustrative embodiments of the invention.

Figure 1:
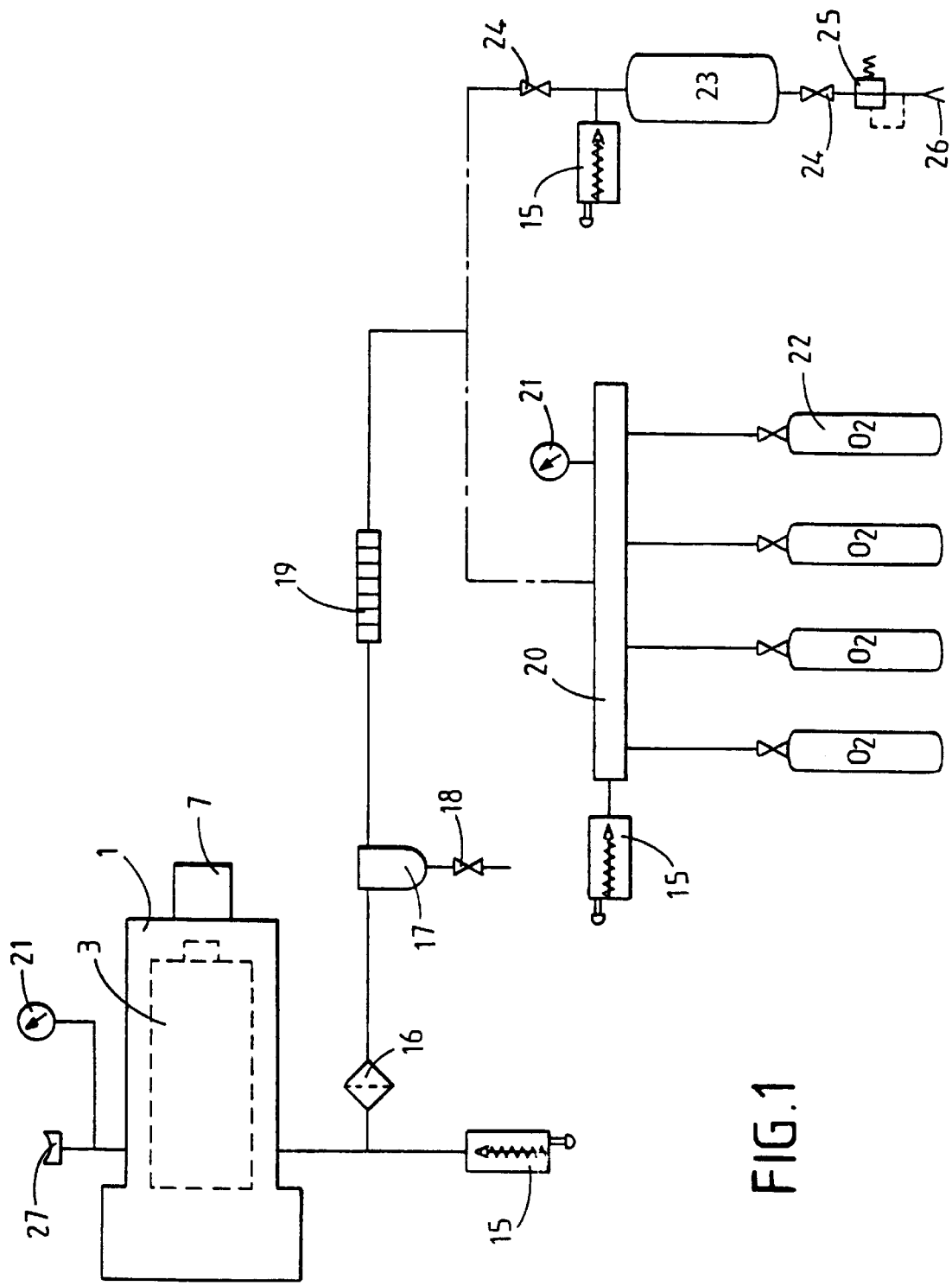
FIG. 1 is a diagram showing the principle of the device according to the invention.

FIG. 1 shows a device according to the invention, comprising:
a reaction chamber 1,
an igniting device 7,
a candle 3, and
a system of apparatuses and accessories which are necessary for operating and for using the device.

After the candle 3 has been ignited, by means of the igniting device 7, oxygen leaves the reaction chamber 1 and undergoes, in the filter 16, a first filtration with respect to suspended solid particles conveyed by the gas: microparticles of solid components of which the candle is composed, such as thermal insulation components and packing products. Next, the gas passes through a condensing filter 17 which condenses the water-vapour residues produced during the chemical reaction; the water thus condensed is purged at every production cycle by means of the valve 18. The valve 15 and the rupture-disc-type device 27 ensure that the operation of the reaction chamber is completely safe.

At this stage in the purification, the gas has a purity which complies with the European Pharmacopoeia.

A third filtration, using the filter 19, makes it possible to reduce the carbon monoxide and dioxide content, to lower the dew point and to remove possible traces of unpleasant smells from the gas produced.

The purity of the gas depends at this point essentially on the dimensions of the filter 19; the rated values obtained are 99.9% of oxygen, less than 2 ppm of carbon monoxide and less than 30 ppm of carbon dioxide.

After leaving the filter 19, two options of using the oxygen may be envisaged:
a manifold 20 for high-pressure filling of oxygen bottles 22 of water capacity adapted to the volume generated during the chemical reaction. These bottles may be connected to the manifold by a system of quick-release couplings, thus facilitating the filling operations in the field. The pressure gauge 21 is used to indicate the pressure within the manifold 20 for the bottles 22; the safety valve 15 together with that on the reaction chamber provides redundancy in terms of high-pressure safety;
a high-pressure tank 23 of capacity adapted to the volume of oxygen generated and acting as a gas storage unit.

The valves 24 allow the tank to be isolated. Next, the oxygen is expanded through the expander 25 in order to be able to be used directly in a first-aid ventilator connected to the outlet 26 and operating at 3.5 bar in the case of an emergency medical unit; the valve 15 has the same function as that described above.

Figure 2:
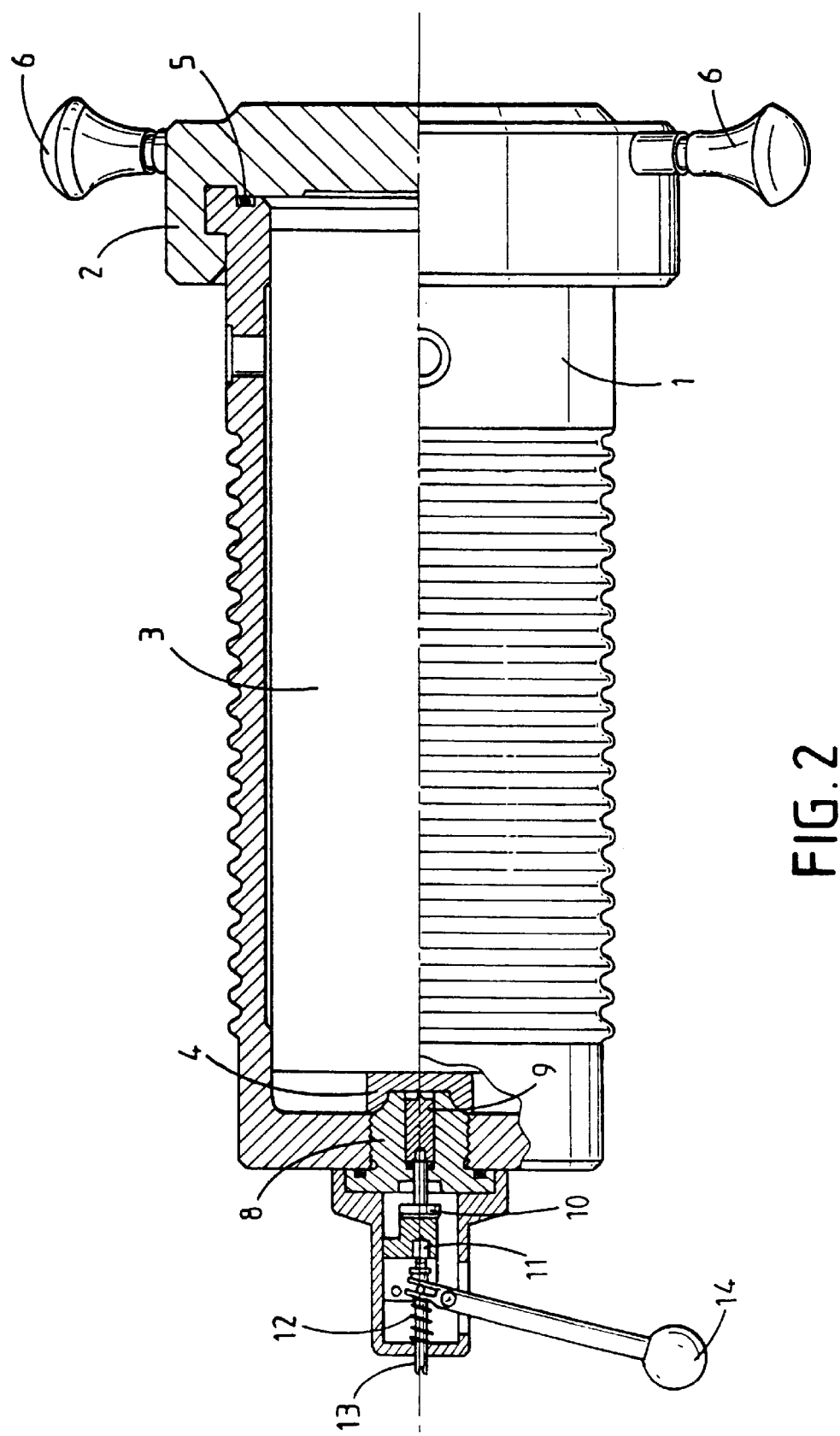
FIG. 2 is a semi-sectional view of a reaction chamber for a chemical candle.

FIG. 2 shows an illustrative embodiment of a reaction chamber designed and manufactured for an internal service pressure of 150 bar. This chamber was subjected to a proof pressure of 225 bar, in accordance with the regulations on gas-pressure apparatuses.

The confinement chamber is in the form of a cylindrical tube 1, called the body, and of a cover or lid 2.

The component 3, placed inside, represents the candle with its pyrotechnic igniter holder 4.

The closure system is sealed between the body 1 and the cover or lid 2 by a special dynamic seal 5 which can resist the constraints with regard to pressure, temperature, nature of the gas and possible ignition due to the high pressure.

A cover support arm allows the movements for opening and closing the cover or lid 2 with respect to the body 1.

The opening movement is carried out by:
a rotation of the cover 2 about the main axis of symmetry of the reaction chamber, by means of the handles 6,
a translation of the cover along a guide integral with the support arm,
a simultaneous rotation of the cover 2 and of the support arm about an axis lying perpendicular to the main axis of symmetry of the reaction chamber.

In respect of the opening movement, a mechanism allows indexing in the fully open position of the support arm and of the cover 2.

In respect of the closing movement, a mechanism likewise allows strict indexing in the locked position of the cover 2 with respect to the body 1.

The components 7 to 14 are the components making up the candle-igniting device.

The mechanical percussion system illustrated in FIG. 2 does not exclude other processes allowing the candle to be ignited by an electrical, piezoelectric, thermal or chemical system.

The arming lever 14 makes it possible, by rotation about its operating axis, to compress the spring 12. The hammer 11 then undergoes a rearward movement by translation of the guides 13 in the casing. The movement is interrupted as soon as the lever is no longer in contact with the hammer. The latter, propelled by the spring 12, strikes the component 10 integral with the needle 9 sliding in the component 8, the needle in turn violently striking the igniter holder 4 of the candle.

The igniting device is sealed by means of a system of seals capable of withstanding the aforementioned constraints.

The needle 9 is initialized automatically as soon as the pressure rises in the reaction chamber.

The device is then ready for a new ignition of the candle.

Since the oxygen emission is confined within the chamber, the pressure can rise up to the set pressure of the safety valve, the pressure of the valve being equal to the maximum operating pressure increased by 10%. In the event of an anomaly, a second safety device, of the rupture-disc type, ensures that the apparatus operates completely safely, the pressure for rupturing the disc being equal to the maximum service pressure increased by 20%.

Figure 3:
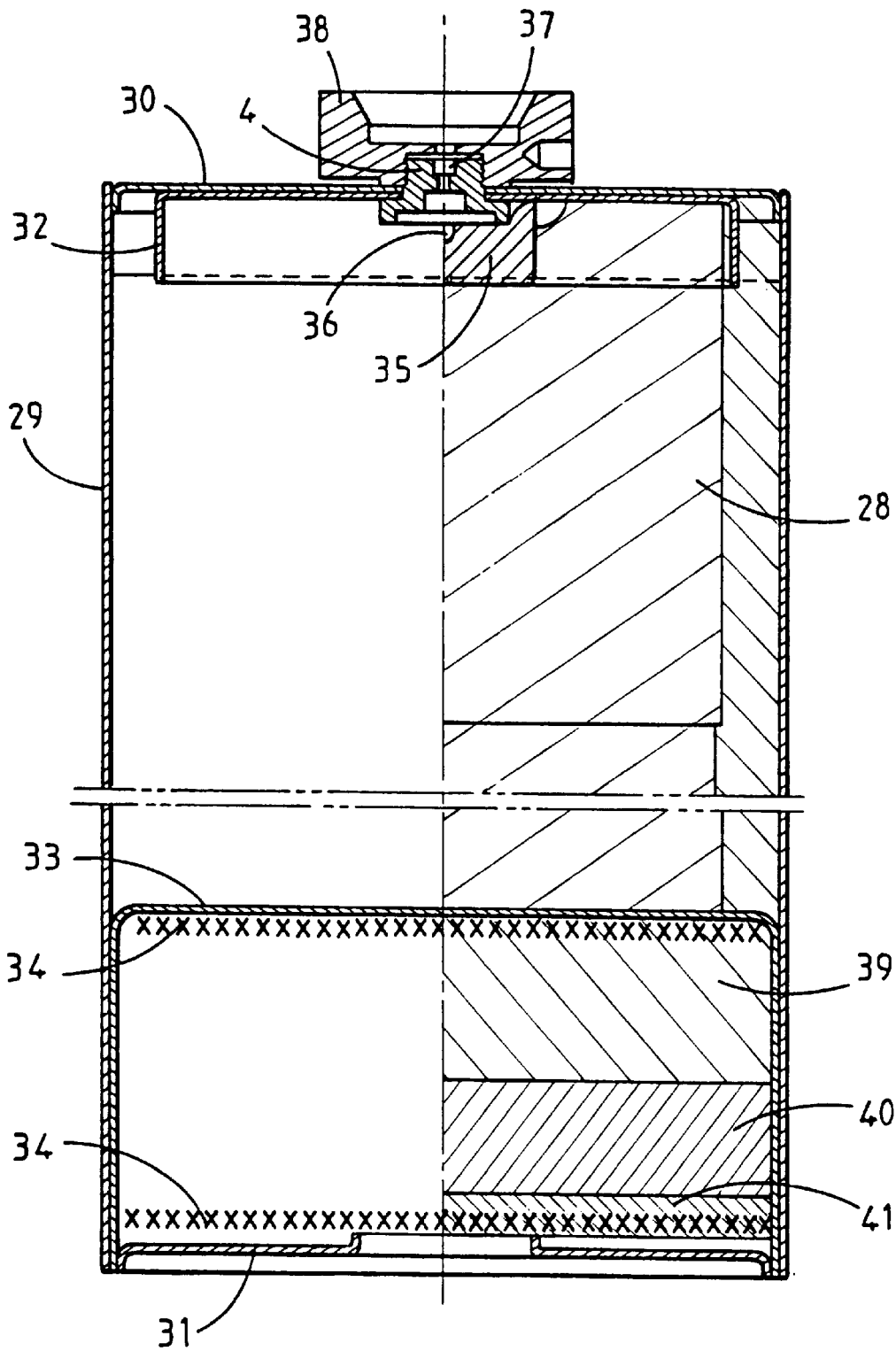
FIG. 3 is a sectional view of a chemical candle.

FIG. 3 shows an illustrative embodiment of a chemical candle.

The candle comprises a casing 29, made of special steel, which is provided with an upper gastight cup 30 made of the same material and containing the active mass 28 of the candle composed of several stacked and self-centered blocks.

The filter cartridge 33 is composed of two meshes 34, of an adsorption filter based on soda lime and hopcalite 39 and molecular sieve 40, and of a particle filter 41 made of mineral wool; the assembly is closed by an outlet cap 31.

The candle is fitted with an igniter holder 4 provided with an igniter 37 and an adapting fitting 38.

The copper cup 32 limits the oxycutting effects due to the ignition of the compressed igniting body 36 and of the igniting pellet 35.

The non-limiting examples below illustrate the description.

EXAMPLE 1

Breathing-oxygen Candle
Active mass: 7449 grams (with 7, 4 and 2% of magnesium) Relative density 2.39
Packing lime: 1100 grams of average lime (soda lime) 250 grams of molecular sieve.

EXAMPLE 2

Medical-oxygen Candle
Active mass: 7449 grams (with 7, 4 and 2% of magnesium) Relative density 2.39
Packing lime: 700 grams of lime (not soda lime)
Packing hopcalite: 100 grams
Filter cartridge: 100 grams of hopcalite 500 grams of lime (not soda lime).

The device according to the invention has the following advantages:

- simple device, which can be operated by someone not experienced in running sophisticated equipment;
- excellent reliability and very little maintenance of the device, since it has few components, most of these being static, capable of withstanding all types of constraints encountered on the field;
- low volume and low mass, facilitating transportation, transportation by air or even parachuting;
- instantaneous oxygen production as soon as the ignition is triggered, making it possible to meet the requirements of a medical emergency unit;
- the oxygen generated is warm and slightly wet, allowing the use in oxygenotherapy without subsequent humidification;
- supply of a gas which complies with the European and medical standards; and
- the possibility of high-pressure filling of bottles and tanks.

What is claimed is:

1. A self-contained device for generating high-pressure breathing oxygen comprising an oxygen-generating chemical candle, a gastight elongated confinement chamber housing the candle, means for igniting the candle at one end of said chamber, means for percussing the igniting means and means for filtering oxygen generated by the candle on ignition, said filtering means being positioned at the other end of said chamber, the igniting means comprising a compressed mixture of titanium and boron and the filtering means comprising a cartridge containing a mixture of lime or soda lime and molecular sieve, said filtering means being packed in said chamber around the end of said candle opposite to the igniting means to filter oxygen generated by said candle, the cartridge for said filtering means including an outlet cap for the discharge of oxygen generated by said candle after passing through said filtering means.

2. The device of claim 1 wherein the percussion means comprise a first part integral with the gastight confinement chamber and a second part which is independent of the first part actuated by an external actuator, said first part of said percussion means comprising a movable needle, said needle including an internal face communicating with the pressure of the oxygen generated, and said second part comprising a hammer translationally guided and propelled by springs, and a manual arming lever for actuating said hammer.

3. The device of claim 1 wherein the chemical candle is a solid agglomerate composed of sodium chlorate, sodium dichromate, manganese dioxide, magnesium and demineralized water.

4. The device of claim 3 wherein the chemical candle is a solid agglomerate having a relative density of at least 2.4.

5. The device of claim 1 wherein the filtering means further comprises a mixture of hopcalite oxides and hygroscopic salts.

6. The device of claim 5 wherein said mixture is in direct contact with the candle together with lime in the form of granules positioned around the candle within the filter cartridge closest to the candle end.

7. The device of claim 1 wherein the molecular sieve is placed at the end of the candle as far away from high-temperature regions as possible.

8. The device of claim 1 wherein the chamber comprises a body and a cover made of the same material and which has been rendered self-lubricating and wear-resistant.

9. The device of claim 8 wherein said material istitanium or a special steel.

10. The device of claim 8 wherein the body and cover of the confinement chamber are mechanically coupled by a bayonet device.

11. The device of claim 1 wherein the filtering means includes an additional filter positioned outside the chamber and comprising lime or soda lime, a molecular sieve, hopcalite and activated carbon.

12. The device of claim 1 wherein the filtering means in the cartridge comprise a fine-particle filter.

13. The device of claim 12 wherein the fine-particle filter comprises mineral wool.

14. The device of claim 1 including a discharge valve to allow air contained in the chamber to be removed when the candle ignites.

* * * * *